United States Patent [19]

Bretthauer et al.

[11] Patent Number: 4,701,932
[45] Date of Patent: Oct. 20, 1987

[54] METHOD FOR REGULATING THE ELECTRODES IN A FURNACE HAVING FREELY BURNING ELECTRIC ARCS

[75] Inventors: Karlheinz Bretthauer; Hans-Dietrich Obenauf, both of Clausthal-Zellerfeld, Fed. Rep. of Germany

[73] Assignee: Fried. Krupp Gesellschaft mit beschränkter Haftung, Essen, Fed. Rep. of Germany

[21] Appl. No.: 847,923

[22] Filed: Apr. 3, 1986

[30] Foreign Application Priority Data

Apr. 3, 1985 [DE] Fed. Rep. of Germany ....... 3512178

[51] Int. Cl.⁴ ............................................. H05B 7/148
[52] U.S. Cl. ...................................... 373/104; 373/105
[58] Field of Search ................................. 373/104, 105

[56] References Cited

U.S. PATENT DOCUMENTS 3,662,075 5/1972 Sakai et al. ......................... 373/105

FOREIGN PATENT DOCUMENTS 2437887 2/1976 Fed. Rep. of Germany .
2440960 3/1976 Fed. Rep. of Germany .
2405252 12/1978 Fed. Rep. of Germany .

OTHER PUBLICATIONS

Höke, Werner, "Der Spannungsbedarf des stationären Hochstromlichtbogens in einem Lichtbogenofen für die Stahlherstellung", Jul. 29th 1980.

Primary Examiner—Roy N. Envall, Jr.
Attorney, Agent, or Firm—Spencer & Frank

[57] ABSTRACT

A method for the optimum regulation of the electrodes of a three-phase electric arc furnace wherein each electrode has an associated arc voltage regulator which receives the associated arc voltage as its actual value and a desired arc voltage value as its reference value; and wherein, to form the desired arc voltage value, during each halfwave, a voltage porportional to the actual arc current and a limit value, which corresponds to the desired arc length, are provided, and the smaller momentary value, with respect to magnitude, of the current proportional voltage and of the limit value is always fed to the arc voltage regulator as the desired arc voltage value.

7 Claims, 5 Drawing Figures

FIG. 1c
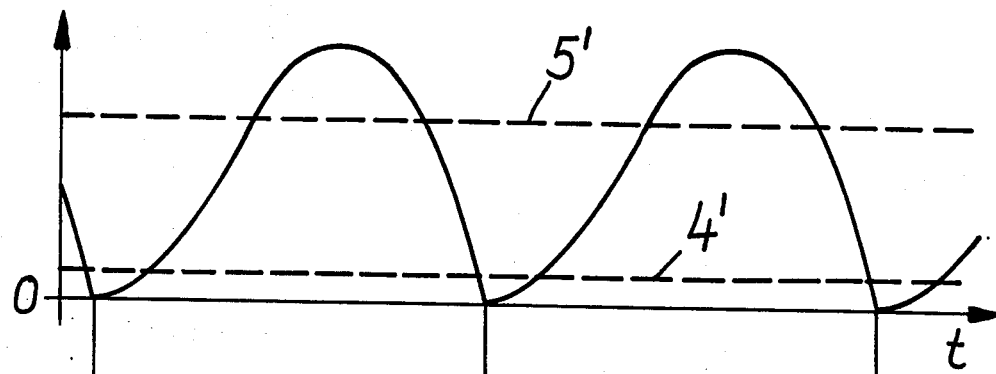
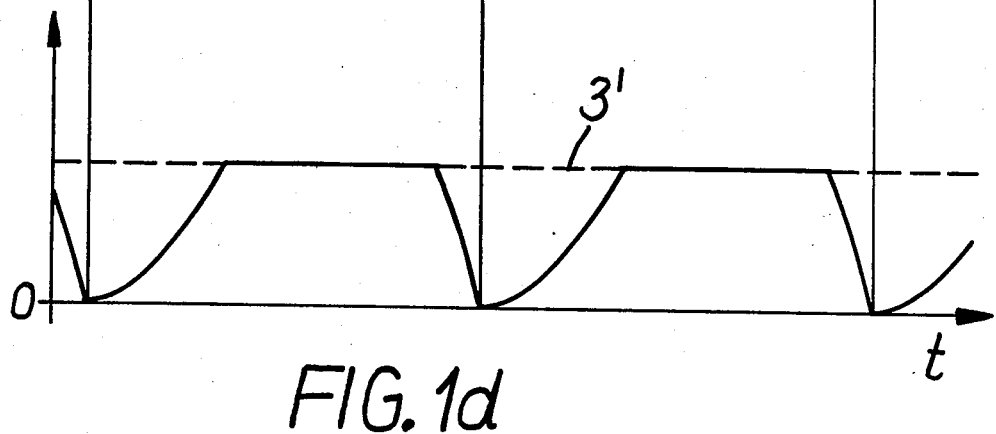
FIG. 1d

METHOD FOR REGULATING THE ELECTRODES IN A FURNACE HAVING FREELY BURNING ELECTRIC ARCS

CROSS REDERENCE TO RELATED APPLICATIONS

The invention which is the subject of this application is related to the subject matter of the following U.S. patent applications filed by us on the same date as the present application and the subject matter of which is incorporated herein by reference:

(1) application Ser. No. 847,732, entitled METHOD AND APPARATUS FOR ELECTRICALLY BALANCING THREE-PHASE ARC DISCHARGE FURNACES and (2) application Ser. No. 847,921 entitled: METHOD AND APPARATUS FOR REGULATING ARC DISCHARGE FURNACE.

BACKGROUND OF THE INVENTION

The present invention relates to a method for regulating the heights of the electrodes in a three-phase melting furnace having freely burning electric arcs in dependence on the arc voltages derived from the phase voltages and from drops in active and reactive potential across the high current lines, with each electrode having an associated arc voltage regulator which receives the arc voltage as the actual value and a desired arc voltage value as a reference value.

Conventional electrode regulating systems for three-phase electric arc furnaces primarily employ the so-called impedance regulation method. That is, for each electrode, the quotient is formed of the voltage measured between the high current path and the neutral or star point of the bath divided by the current of the respective high current path. This measured value is then the actual value used for impedance regulation. Aside from the fact that this manner of regulating tends to correctly influence the level or height of the electrode only if the deviations from normal operating states are not too great, it has a number of additional drawbacks.

Firstly, the changes taking place in a high current path, for example, due to changes in electrode position, have an effect on the measured impedance values of the other two electrodes and, in spite of their being in the correct position with respect to the desired final state, cause them to perform a reaction movement which is reversed during the course of the further regulating process. The three control circuits are not decoupled.

Moreover, the measured value (impedance) is not a reliable measure for the arc lengths. That is, in spite of the same desired impedance values, considerable differences may develop between the lengths of the three arcs.

Finally, in extreme situations, e.g. if one electrode comes into contact with the bath (scrap), undesirable electrode movement may take place with resulting damage, for example, if an electrode that is in contact with the scrap is further reduced in height, i.e., lowered, due to such error reactions, and thus electrode breakage occurs.

These disadvantageous phenomena can be avoided if a measuring value is employed which is the best possible representation of the desired setting value, namely the length of the arc, which is adjustable by changing the height of the electrode above the bath.

Federal Republic of Germany Offenlegungsschrift DE-OS 2,440,960 indicates to the person skilled in the art, in FIG. 5 and the associated text, that in certain regions of the arc current one must assume that there is only a slight dependency of the arc voltage upon the current. This view has been reinforced in the meantime by a dissertation by Werner Höke, entitled "Der Spannungsbedarf des stationären Hochstromlichtbogens in einem Lichtbogenofen für die Stahlherstellung" (Voltage Requirement for the Stationary High Current Arc in an Electric Arc Furnace for the Production of Steel) dated July 29, 1980 and by extensive theoretical examinations, the results of which are discussed (see particularly pages 77-83) and are shown in FIG. 18 of that dissertation. In a range between about 15 to 80 kA, the substantial constancy of the arc voltage is confirmed. It is therefore appropriate to assume that in medium and large size electric arc furnaces operating with current intensities up to about 70 kA, the voltage drop of the arc does in effect take on an almost constant value shortly after the current passes through zero. This is confirmed by numerous oscillograph arc voltage curves published in the literature. To decouple, on the one hand, the three high current circuits with respect to electrode regulation and, on the other hand, to avoid imprecise or erroneous reactions, it is therefore appropriate to use the arc voltage as the direct variable for electrode regulation, particularly since changes in the distance between the electrode and the bath are clearly reflected in the sign of the change of the average arc voltage.

The arc voltage can be determined by measuring, for example, according to the teaching of Federal Republic of Germany Auslegeschrift No. DE-AS 2,405,252 in conjunction with the teaching of Federal Republic of Germany Offenlegungsschrift No. DE-OS 2,437,557. With this measuring method it would be possible to use the arc resistance (quotient of arc voltage over arc current) as the regulating variable instead of the above-described impedance. This would initially have the advantage that when all electrodes are lowered in the currentless state, the measured arc voltage and the measured arc current are zero for the electrode which is the first to come in contact with the scrap. This results in an undetermined quotient and thus, correctly, no actuation of the electrode regulation, i.e., the electrodes remain stationary.

In the case of pure voltage regulation, however, this operating state would lead to the result that the electrode, which first comes in contact with the bath, would dance up and down. This results from the fact that in the raised state, the effective mains voltage to neutral is greater than the desired value of the arc voltage, while upon contact with the bath the situation is reversed.

SUMMARY OF THE INVENTION

Thus it is an object of the present invention to provide a method which offers optimum electrode regulation without the drawbacks of the above-described methods and prevents the undesirable gap operation.

The above object is achieved according to the present invention by a method for regulating the height of the electrodes in a three-phase melting furnace operating with freely burning electric arcs in dependence on the arc voltages, and with each electrode having an associated arc voltage regulator which receives the arc voltage as the actual value and a desired arc voltage value and which produces a regulating value therefrom, wherein the method includes the steps of determining the respective arc voltages from the phase voltages and the active and reactive voltage drops across the respective high current lines, and feeding the respectively determined arc voltage values and the associated desired arc voltage values to the associated regulators; and wherein the respective desired arc voltage values are formed by: providing a voltage which is proportional to the actual arc current; providing a limit value corresponding to the desired arc length; and, during each half wave of the arc current proportional voltage, utilizing the smaller momentary value, with respect to magnitude, of the arc current proportional voltage and the limit value as the desired arc voltage value which is fed to the associated arc voltage regulator.

Thus, according to the present invention, the desired arc voltage value simulates a trapezoidal halfwave curve of the arc voltage, with the flanks of the trapezoid being proportional to the arc current and the peak of the trapezoid being formed by a desired value for the length of the arc. The halfwave curve of the desired arc voltage value is thus formed in each case by the smaller momentary value of the above-mentioned parameters.

According to the present invention, it is thus not a direct voltage which is used as the desired voltage value for regulating the arc voltage, as is otherwise customary for desired values in the regulating art, but a desired value curve which approximates the halfwave shape of the actual arc voltage. The "sides of the trapezoid" are shaped so as to be proportional to the actual arc current. Only the height of the "peak of the trapezoid" is determined by a desired value which, as a direct voltage, is formed manually or by a control program or from a process variable. The smaller one of the two values, the "current proportional voltage" or the "desired peak value" produces the desired arc voltage value for every point in time.

Compared to prior art methods, this method has the following advantages.

On the one hand, in the extreme case where the electrode rests on the bath without current, no desired voltage value results. Since the peak desired value is not reached, the latter becomes ineffective. The electrode regulating system is stopped and undesirable electrode movement is thus prevented.

Moreover, the total desired value for the arc voltage, formed of the flanks of the arc current and the peak desired value, is adapted substantially to the actual curve of the desired voltage value to the extent that no smoothing members are required in the arc voltage regulating circuit, for example for forming the actual value, and thus optimum regulation dynamic prerequisites are created.

To use the arc current itself to form the flank of the desired arc voltage value is appropriate also on the basis of the following realization:

It is known from measurements that the arc voltage halfwave changes the more from a trapezoidal shape toward a sinusoidal shape, the greater the ratio of the arc voltage or arc length, respectively, to the driving mains voltage. That is, if the mains voltage is relatively low, the current is also relatively low and correspondingly so are the voltage drops across the feeder lines and in the mains transformer, which, for larger currents, require a significant portion of the mains voltage. As a consequence, the steepness of the changes, i.e. particularly the change between negative and positive values and vice versa, becomes less for the current as well as for the arc voltage.

By fixing a time period, which depends on the respective particular furnace data, after each zero passage of the current after which the trapezoidal flank of the desired arc voltage value given by the actual current value is no longer allowed to rise, the undesirable gap operation can also be prevented.

Gaps are known to be produced when the arcs are too long, i.e. the arc voltages are too high relative to the mains voltage. Due to the low driving voltage, the dropping current already reaches zero at a point in time before the opposite polarity mains voltage is able to fire it in the opposite direction, and consequently there is a gap in the current. Moreover, the current has strong harmonics and tends to fluctuate greatly in amplitude. Both of these conditions are undesirable with respect to the mains. Since, according to the method of the invention, the electrode regulation system sets a shorter arc than required for the desired peak value, gap operation is prevented automatically.

If, in a broader regulating concept, another regulating value is superposed on the arc voltage regulation in a higher order regulating circuit, e.g. a current regulating circuit is superposed on the arc voltage regulation, then the superposed regulating circuit always goes into action exclusively at the peak desired value in which case, as already mentioned, the desired voltage value always has the lowest peak value of all influential variables.

According to features of the invention, for every halfwave of the desired value, the limit value may be given in the form of a direct voltage value (peak value) and may possibly have only one polarity for all halfwaves.

In practical furnace operation, there is also an appropriate minimum dimension for the height of the tip of the electrode above the bath, and a corresponding arc length, which should be maintained under all circumstances, inter alia because movements of the bath would otherwise cause strong fluctuations of the arc length with corresponding amplitude fluctuations of arc voltage and arc current. It is therefore appropriate according to another feature of the invention that guide values for the arc length coming out of the process do not fall below a minimum value which depends on the furnace involved.

According to a further feature of the above-described regulating method, the peak value is obtained as a guide variable from the process, i.e. from a variable derived from the process, such as the arc voltage, the amount of wear or the current or is given by a program. This means that the respective limit value to be selected may possibly change as well with time.

Moreover, according to still a further feature of the invention, the upper limit value is formed by that momentary, current proportional flank value which has formed at the end of a given period of time from the zero passage of the current, if such flank value is smaller in magnitude than the peak value.

BRIEF DESCRIPTION OF THE DRAWINGS

FIGS. 1c and 1d are respectively schematic representations of a rectified arc current and the corresponding desired value for the arc voltage according to the present invention.

DETAILED DESCRIPTION OF THE PREFERRED EMBODIMENTS

Figure 1A:
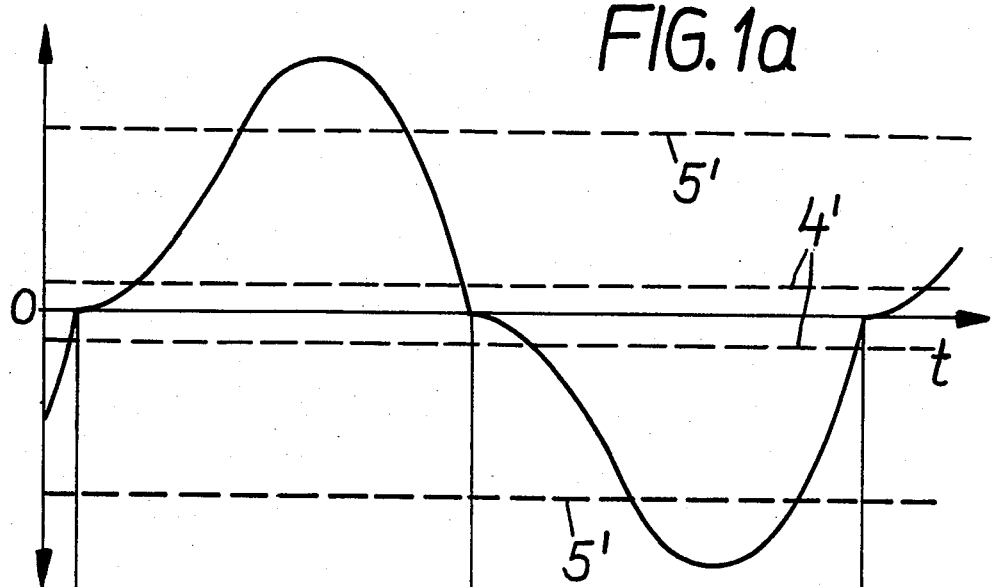
FIGS. 1a and 1b are, respectively, schematic representations of an alternating arc current and the corresponding desired value for the arc voltage according to the method of the invention.
Figure 1B:
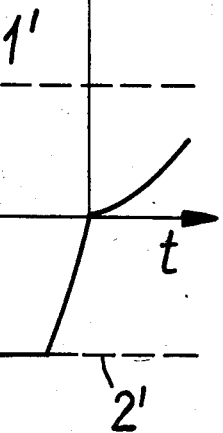

FIG. 1a shows the approximately sinusoidal current curve of which the desired arc voltage value in FIG. 1b is a "simulation". The differences between the two curves shown in FIGS. 1a and 1b are that the desired voltage value does not go above or below a certain upper and a certain lower limit value 1' and 2' respectively, shown in dashed lines in FIG. 1b. The amounts or magnitudes of these limit values 1' and 2' are set so that they lie between an upper limit 5' and a lower limit 4' of the current curve. The lower limit 4' is dependent on the particular furnace utilized and corresponds to a minimum arc length which should be provided as discussed above.

In contrast to FIGS. 1a and 1b, FIG. 1d shows the corresponding formation of the desired arc voltage value for a rectified arc current according to FIG. 1c. With this manner of forming the desired value as well, an upper limit value 3' of the desired arc voltage value is not exceeded, and this limit value 3' is set so that it likewise lies between the minimum and maximum limit values 4' and 5' of the arc current.

Figure 2:
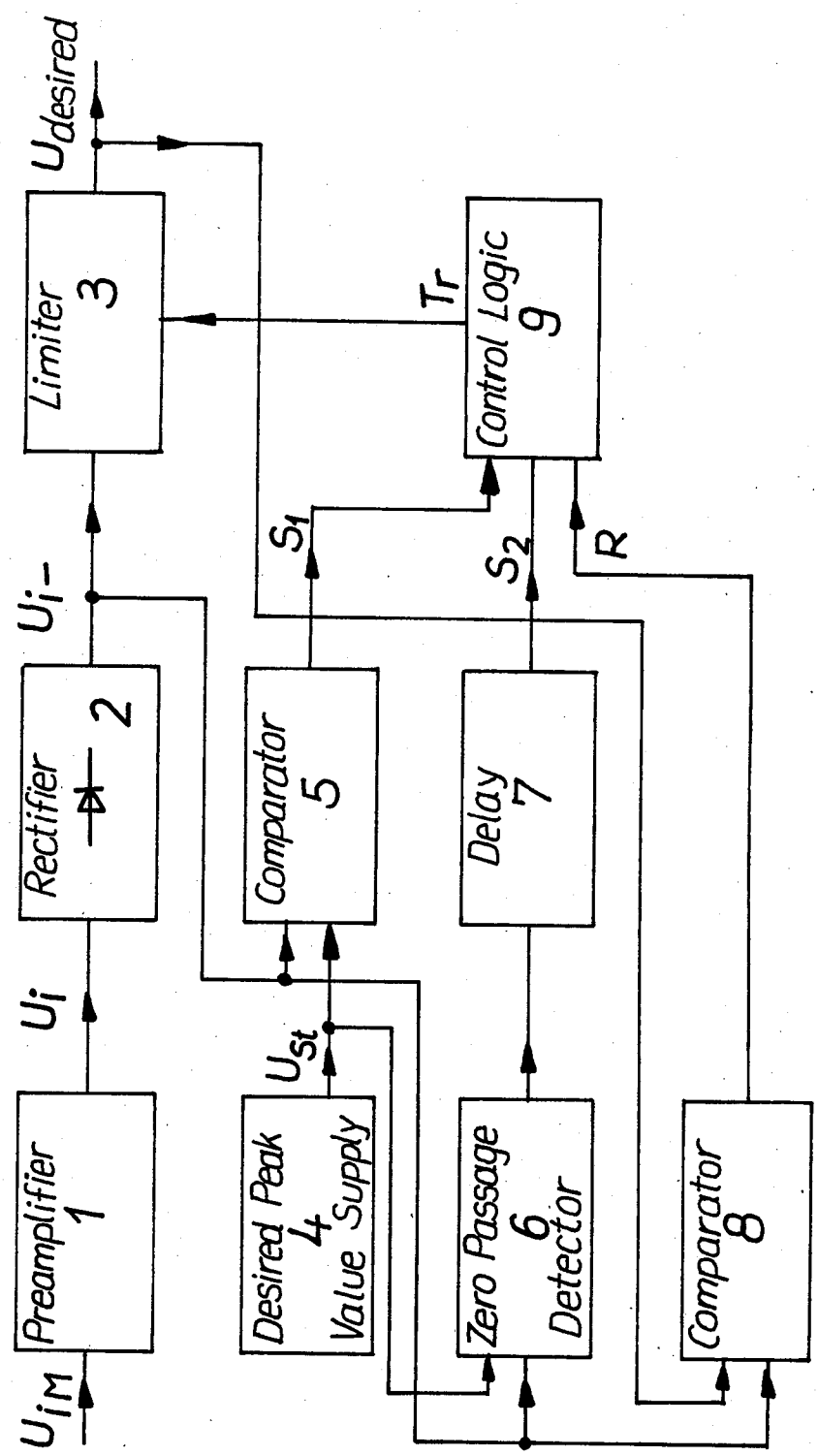
FIG. 2 is a schematic representation of a device for producing a desired arc voltage value according to the method of the invention.

Turning now to FIG. 2, there is shown a block circuit diagram for a preferred embodiment of a circuit for forming the desired arc voltage value according to the method of the present invention. A voltage value $U_{iM}$ proportional to the arc current is determined by means of prior art measuring systems, as disclosed, for example, in Federal Republic of Germany published Patent Application No. DE-AS 2,405,252 and in Federal Republic of Germany Laid Open Patent Application No. DE-OS 2,437,557, and is fed to a preamplifier 1 so as to form a voltage value $U_i$. This voltage value $U_i$ which was amplified in preamplifier 1 is subsequently fed to a rectifier 2. The rectified voltage value $U_{i-}$, which is proportional to the arc current, is fed to a limiter 3, to a comparator 5 and to a zero passage or crossing detector 6. The limiter 3 passes on the value it receives at its input, without change, as the desired arc voltage value $U_{desired}$, unless limiter 3 receives a control signal $T_r$ from a linking member or control logic circuit 9. This control logic circuit 9 emitts the control signal $T_r$ whenever the current proportional desired voltage value reaches a higher magnitude than the given desired peak value i.e., the limit value. The desired peak value is formed in a desired value determining member 4 as the direct voltage value $U_{St}$ and this output value $U_{St}$ is fed both to the comparator 5 and to the zero passage detector 6. The member 4 may simply be a variable voltage which can be manually set between the limit values 4' and 5' (FIG. 1a and 1c) or which can be set automatically, for example by a variable of the process being regulated or via a program in a process control computer.

In the comparator 5, the desired peak value $U_{St}$ supplied by member 4 is compared with the rectified, current proportional voltage $U_{i-}$ provided at the output of rectifier 2. As soon as the voltage $U_{i-}$ reaches the value of $U_{St}$, for example the limit value 3' of FIG. 1d, comparator 5 produces an output signal $S_1$ which is fed to linking member or control logic circuit 9, causing it to emit the control signal $T_r$ which in turn causes limiter 3, via the $T_r$ signal, and no later than at this point in time, to retain the momentary value reached by the $U_{i-}$ signal until the signal $U_{i-}$ falls below the desired value $U_{St}$. In this way, the trapezoidal desired value is produced for the arc voltage $U_{desired}$, whose peak value corresponds to the desired arc length.

If voltage $U_{i-}$ itself reaches the value zero, as the arc current passes through zero, and is close to producing a gap, (in zero passage detector 6, the input signal $U_{St}$ serves as an auxiliary signal for detecting the onset of a gap), the output signal of zero passage detector 6 produces an output signal which is fed to a delay member 7 which has a fixedly set delay period. After this delay period has expired, the output signal $S_2$ of delay member 7 causes linking member 9 to produce its output signal $T_r$ and thus cause the limiter 3 to limit its output signal $U_{desired}$ to the momentary value which the $U_{i-}$ signal has reached at this time, unless signal $S_1$ of comparator 5 has already caused member 9 to produce the output signal $T_r$. Whichever one of signals $S_1$ or $S_2$ occurs first, thus causes the limit or peak value of the desired arc voltage value $U_{desired}$.

In order to reset the logic circuit 9 and cause same to retract or extinguish the control signal $T_r$ actuating the limiter 3, a further comparator 8, which produces a reset signal R at its output, is provided. The comparator 8 has its output connected to the control circuit 9, and its two inputs respectively connected to receive the voltage value $U_{i-}$ generated by rectifier 2 and the signal $U_{desired}$ at the output of limiter 3. Reset signal R is produced by comparator 8 and sent to control circuit 9 whenever the $U_{i-}$ signal becomes smaller than the limit or peak value of $U_{desired}$ at the end of a half period.

It will be understood that the above description of the present invention is susceptible to various modifications, changes and adaptations, and the same are intended to be comprehended within the meaning and range of equivalents of the appended claims.

What is claimed is:

1. In a method for regulating the electrodes in a three-phase melting furnace operating with freely burning electric arcs in dependence on the arc voltages, and with each electrode having an associated arc voltage regulator which receives the arc voltage as the actual value and a desired arc voltage value and which produces a regulating value therefrom, said method including determining the respective arc voltages from the phase voltages and the active and reactive voltage drops across the respective high current lines, and feeding the respectively determined arc voltage values and the associated desired arc voltage values to the associated regulators; the improvement comprising forming the respective said desired arc voltage values by: providing a voltage which is proportional to the actual arc current; providing a limit value corresponding to a desired arc length; and, during each half wave of the said arc current proportional voltage, utilizing the smaller of the momentary value, with respect to magnitude, of said arc current proportional voltage and of said limit value as said desired arc voltage value which is fed to the associated arc voltage regulator.

2. A method as defined in claim 1, wherein said limit value for each said halfwave is a direct voltage value (peak value).

3. A method as defined in claim 2, wherein said desired arc voltage value for all halfwaves has only one polarity.

4. A method as defined in claim 3, further comprising limiting the value of said desired arc voltage value which is fed to the regulator to that momentary, current proportional voltage value which has formed at the end of a given period of time after the zero passage of said current proportional voltage, if the magnitude of said current proportional voltage after said given period of time is lower than said limit value.

5. A method as defined in claim 2, including setting the magnitude of said limit value (peak value) so that it does not fall below a minimum limit.

6. A method as defined in claim 2 wherein said limit value is obtained as a process variable.

7. A method as defined in claim 2 wherein said limit value is determined from a computer program.

* * * * *